L. A. DURYEA.
AUTOMOBILE TIRE CHAIN REPAIR DEVICE.
APPLICATION FILED AUG. 10, 1918.
1,326,395.   Patented Dec. 30, 1919.
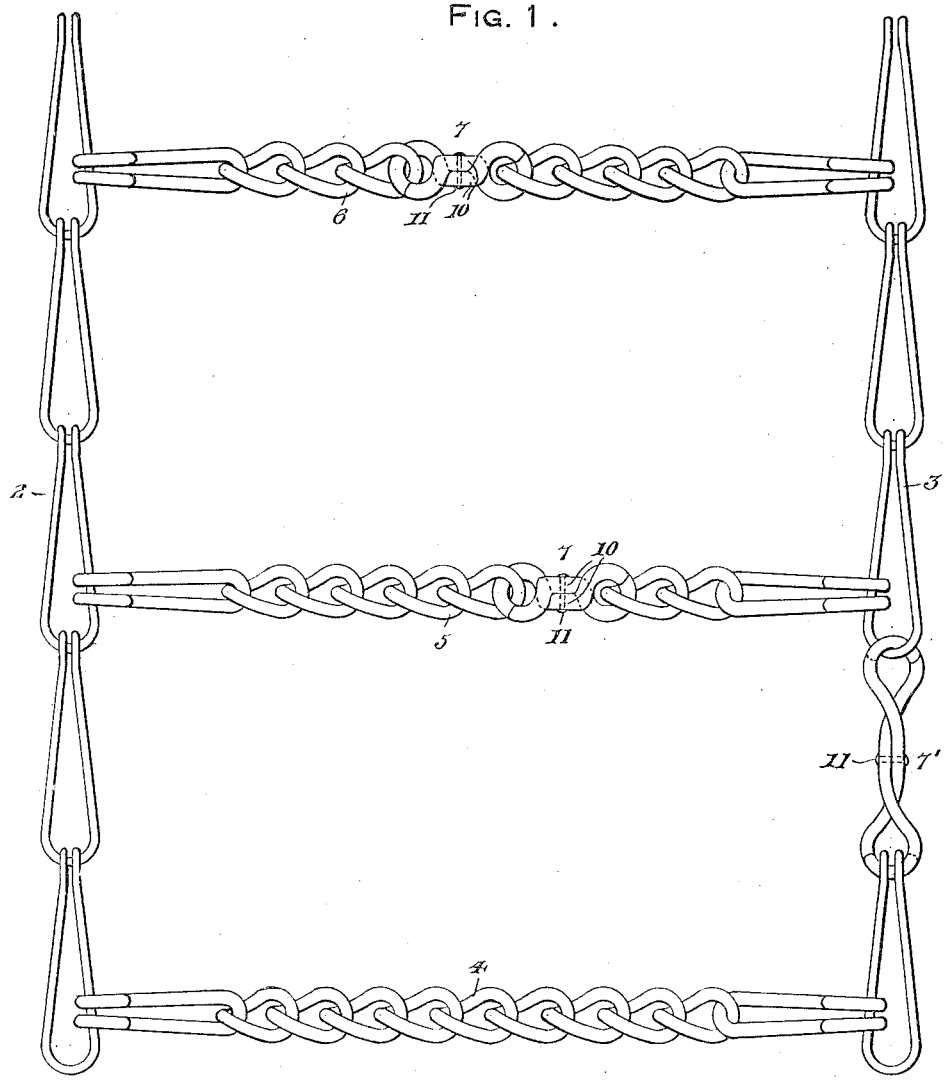
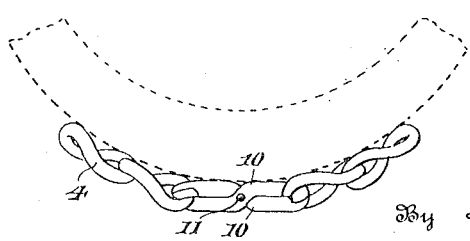
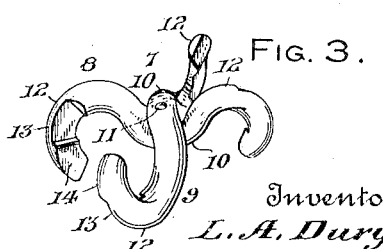
Inventor
L. A. Duryea

UNITED STATES PATENT OFFICE.

LEROY A. DURYEA, OF EAST HAMPTON, CONNECTICUT.

AUTOMOBILE-TIRE-CHAIN-REPAIR DEVICE.

1,326,395. Specification of Letters Patent. Patented Dec. 30, 1919.

Application filed August 10, 1918. Serial No. 249,323.

*To all whom it may concern:*

Be it known that I, LEROY A. DURYEA, a citizen of the United States, residing at East Hampton, in the county of Middlesex and State of Connecticut, have invented certain new and useful Improvements in Automobile-Tire-Chain-Repair Devices, of which the following is a specification.

This invention relates to an automobile-tire-chain repair device. An "automobile tire chain" as it is ordinarily known, comprises two circular side chains and a series of generally equidistantly spaced cross or transverse members or chains connecting the side chains. These cross or transverse members or chains are commonly composed of a number of connected links, the terminal ones of which are connected with the side chains. It is a matter of fact that it is not an uncommon thing and in reality is a frequent occurrence, that one or more links of the transverse or cross members becomes broken. In such an event as this it has been the custom heretofore to discard the entire transverse member or chain and substitute a new one in its place. Very few automobile drivers have any provision with them for making the necessary repairs and when a cross or transverse member or members becomes broken between their ends or other places, the entire transverse member or chain is apt to be lost as often happens. Besides this the loose ends of the cross or transverse members objectionally strike the mud guards. There are other disagreeable factors connected with the present construction which when in normal condition effectually operate to attain the desired end, that is, to prevent slippage of the automobile wheels. To eliminate the drawback to which I have alluded, I have provided a means by which a driver can effect in a simple, ready and easy manner the proper repair of a transverse member or members. As a matter of fact, this means is capable of association with equal advantage with one or both of the side chains. I might also refer to the fact that at times when a link is broken either in a side chain or a cross chain, the entire "chain" as it is properly considered is quite apt to be lost which is a highly objectional condition and which obviously I eliminate.

In the drawings accompanying and forming part of the present specification I have shown a form of the invention by which the desired objects are secured. This I will set forth in detail in the following description: Clearly I am not restricted to this particular showing as I may depart therefrom in several respects within the scope of the claim following the said description.

Referring to said drawings,

Figure 1 is an inside face view of a chain involving the invention;

Fig. 2 is a side elevation of a cross chain equipped with one of the links embodying said invention, a tire being partly shown by dotted lines;

Fig. 3 is a perspective view of the automobile-tire-chain repair device on a somewhat larger scale than the preceding figures, the same being shown as opened which is the condition it occupies when being either connected with or disconnected from adjoining links of a cross or a side chain. Like characters refer to like parts throughout the several views.

In Fig. 1, I have shown side chains of an "anti-skid chain" as it is usually known, for use in connection for illustration with an automobile. Obviously, these chains may within limits vary somewhat as to character. Those shown are denoted respectively by 2 and 3. They are composed of a number of practically similar links permanently connected as is the fashion. These side chains are connected at proper intervals by cross chains such as 4, 5 and 6, it being assumed that the side chain partly shown in Fig. 2 is that denoted by 4 in Fig. 1. It is a matter of fact in practice as I have already practically observed that when a link in a side chain or one in a cross chain is broken it actually comes out and is lost. In such an event as this the entire chain is freed from the wheel with its attendant disadvantages one being the fact that it is not uncommon to lose it.

The article involving the invention, is as I have termed it, an automobile-tire-chain repair device and it will be clear that it can be used in connection with the side chains or with the cross chains differing in some cases only as to size. The automobile-tire-chain repair device which is associated when necessary with a side chain or chains will be larger somewhat than that employed in conjunction with the cross chains although this may not be necessary because it may be of the same size. In the present case as the repair device is the same when used in connection with the cross chains, I have whenever it appears applied to it the character 7 which is used in a general way. The article used in conjunction with the side chains I will give the character 7' but as I have stated there is no structural difference between the two kinds.

Said repair device 7 consists as illustrated of two practically similar or duplicate sections as 8 and 9 (Fig. 3). Each of said sections involves a body or intermediate portion as 10 of U or bowed form. These two U-shaped bodies 10 interfit although they are of course oppositely disposed. This interlinking or interassociation of said bodies permits a relative lateral motion of the two sections 8 and 9. While these sections 8 and 9 are desirably positively connected together this is not always necessary for under working conditions it may not always be necessary to directly connect them in this positive manner. When, however, they are thus connected a pivot as 11 is utilized to make the connection. This pivot may consist of a pin extending through the outer portion or transverse portions of the two interfitted U parts 10. The pivot or pin is headed at its ends which thus provides a simple way of holding it in position against accidental loss. From the ends of the two U bodies 10 are similar hooks denoted in each case by 12. Really therefore each section (8 and 9) is of practically S or serpentine form. When the repair device or link is closed as shown in Figs. 1 and 2 the terminal hooks 12 of the two parts fit substantially against each other. On their inner sides these terminal hooks are flat as at 13 and are provided at their ends with shoulders 14, the shoulders 14 fitting behind each other.

It will be supposed for illustration that the link of a cross chain either 4, 5, or 6 has become lost and that an automobilist desires to make a quick repair. In this event the following procedure may be adopted: The repair link 7 will be opened by separating two adjacent hooks at its ends at which time two opposite hooks at one end will be hooked into the proper link of the cross pin which is being repaired and the other two terminal hooks will be inserted in the terminal link of the cross chain at which point the repair device or link 7 will be closed so as to bring the flat faces 13 to which I have already referred into engagement and with the shoulders 14 interlocked.

It should be noted that when the repair device is closed it is practically flat, the side faces presenting no objectionable protrusions which is important. It will be seen upon reference particularly to Fig. 2 that said repair device 7 fits practically flatwise against the tire or shoe and as a result does not cut thereinto. This condition also prevents the repair device from turning on itself or about its longitudinal axis and as a consequence the sections of each are positively maintained in correct relation with each other and the links of the cross chain are held in longitudinal alinement with each other. It will also be clear that before the repair device or link 7 can be dismounted it is necessary to manipulate it; as a consequence of this condition it is effectually prevented from becoming lost.

What I claim as new is:—

A tire chain repair device in the form of a link, comprising two approximately similar sections, each having a bowed body terminating in hooks, the bows of the bodies facing oppositely and each being fitted in the other to permit relative lateral movement of the sections, the said bowed bodies terminating in hooks, the hooks of the respective sections mating to form eyes when the link is closed, each of the hooks having an inward projection adapted to fit flatwise against an adjacent hook and back of a coöperating projection when said link is in said closed relation.

In testimony whereof I affix my signature in the presence of two witnesses.

LEROY A. DURYEA.

Witnesses:
HERBERT S. BULLARD,
HEATH SUTHERLAND.